M. C. SCHWEINERT.
PRESSURE GAGE.
APPLICATION FILED AUG. 26, 1911. RENEWED DEC. 5, 1919.

1,352,698.

Patented Sept. 14, 1920.

WITNESSES:
René Bruine
T. F. Wallace

INVENTOR:
Maximilian Charles Schweinert,
By Attorneys,
Fraser, Funk & Myers

UNITED STATES PATENT OFFICE.

MAXIMILIAN CHARLES SCHWEINERT, OF WEST HOBOKEN, NEW JERSEY.

PRESSURE-GAGE.

1,352,698.

Specification of Letters Patent.

Patented Sept. 14, 1920.

Application filed August 26, 1911, Serial No. 646,107. Renewed December 5, 1919. Serial No. 342,803.

*To all whom it may concern:*

Be it known that I, MAXIMILIAN CHARLES SCHWEINERT, a citizen of the United States, residing in West Hoboken, in the county of Hudson and State of New Jersey, have invented certain new and useful Improvements in Pressure-Gages, of which the following is a specification.

This invention relates to pressure gages and aims to provide certain improvements therein. The chief object of the present invention is to provide a simple and compact gage which is adapted to be directly connected with a cylinder of a gas or other engine to indicate the pressures therein. The gage is, however, adapted for use in connection with pressure tanks used for storing air for inflating tires, or other receptacles which contain liquid, the pressure of which it is desired to observe.

A further object of the invention is to provide a gage of this class which can also be utilized to determine the pressure in pneumatic tires or other devices having a valve which it is necessary to unseat in order to permit air to flow to the gage. It has been heretofore proposed by me to provide a gage which is adapted primarily for use in pneumatic tires and which has connected therewith a coupling member by means of which it may be also utilized in connection with cylinders, tanks, etc.

In the preferred form of the invention the gage comprises an outer casing which itself is provided with a means for connecting it to a cylinder or tank, such as a screw-threaded portion adapted to engage a portion on the cylinder or tank. The casing is also preferably formed with wrench faces or similar devices which are used in applying the gage to the device with which it is to be connected. This casing is of sufficient length to contain or partly contain the internal mechanism of the gage, and preferably also constitutes one of the indicating members of the gage. By the present invention in its preferred form I provide a gage in which the necessity of a coupling member is obviated and which nevertheless is adapted equally for use for either of the purposes just mentioned. Preferably also the gage is provided at its lower end with a portion adapted to contact with and make a leak-tight joint with a tire valve or the like, and with means for unseating the valve proper of such tire valve. The invention also includes certain other features of construction which will be hereinafter more fully pointed out.

Referring to the drawings,—

Figure 2:
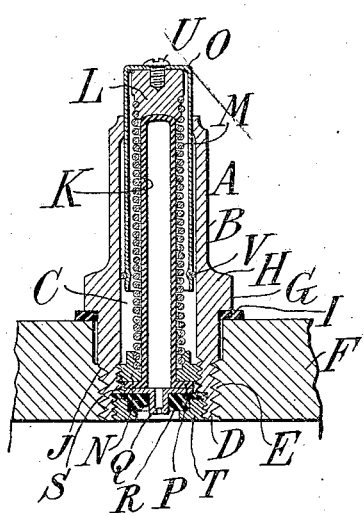
Fig. 2 is a diametrical section of Fig. 1.
Figure 1:
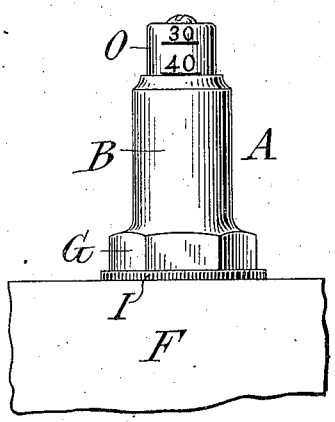
Figure 1 is an elevation of one form of my invention.

In the drawing I have shown my invention as applied to a gage of the type set forth and claimed in application No. 552,111 and No. 712,724, filed by me and Henry P. Kraft jointly.

Figure 3:
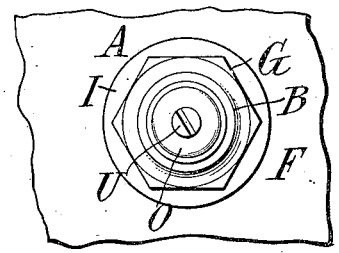
Fig. 3 is a top or plan view.

Referring to the embodiment of the invention illustrated in the drawings, let A indicate the gage as a whole having a casing B. This casing is preferably formed of a length of metal rod of appropriate diameter and is constructed with a longitudinal bore C adapted to receive the internal mechanism of the gage. One object of the present invention is to provide a casing B which is adapted to be directly connected with an engine cylinder or other wall, or, stated otherwise, to provide a gage in which the casing performs not only the function of inclosing the necessary mechanism, but also that of the coupling by which it may be connected to such wall. To this end the casing is formed preferably at its lower part with a means for engaging a wall or the like. These means preferably are screw-threads, such as D, which are designed to engage complementary threads E formed on the part to which it is to be connected which is represented as a wall F. It is preferable also that the casing should have tool faces by which it may be forced into a tight relation with the wall F. These tool faces are preferably wrench faces G, best seen in Fig. 3, and may be advantageously formed as the outer faces of a flange H, the lower side of which is adapted to compress a washer I against the surface of the wall F. Preferably also an inclined shoulder J is formed on the exterior of the casing just above the screw-threads D which is adapted to make a tight joint on a correspondingly shaped shoulder usually present in an engine cylinder or the like.

The gage mechanism may be of any desirable type, but I prefer that illustrated wherein an extensible rubber tube or chamber K is provided, which receives the air or other fluid under pressure, and by expansion pushes upwardly a plunger or head L against the tension of a spring M which is fixed at one end to the plunger or head and at its other end to a collar N located near the bottom of the casing B. The plunger or head L forces up with it an indicating sleeve O upon which is marked a scale showing the number of pounds of pressure of the fluid within. The lower part of the casing B is preferably internally screw-threaded, and the collar N is also preferably threaded to engage therewith. The lower part of the extensible chamber or tube K is formed with a flange P which is pressed against the collar N in such manner as to secure a leak-tight joint between the parts.

In the use of my improved gage solely as an indicator for pressures within an engine cylinder or stationary tank, the extensible tube or chamber K may be freely open at its end to receive pressure from within the cylinder or tank. One of the objects of the present invention is, however, to provide a combined tire and cylinder gage within a single casing, and to this end I provide the lower part of the gage with a deflator Q which is adapted to press against and unseat the valve proper of a tire valve or the like, this deflator being provided with a suitable passage or passages to permit air from the tire to pass upwardly to the chamber K. I also provide a packing R or other suitable means for pressing against the top end of the shell of a tire valve and making a temporarily tight joint between the gage and valve. The deflator Q is preferably formed upon a disk S which extends beneath the flange P of the extensible chamber K and presses the latter upwardly against the collar N. The pressure is supplied to the disk S either through the packing R by a screw-threaded plug T or directly by the plug T pressing against the disk.

When the gage is used as an engine cylinder gage or in a like position, the deflator and packing of the gage are not utilized, except that it is desirable that the opening to the interior of the extensible chamber K be constricted, which function is performed by a small passage through the deflator Q. When it is desired to use the gage as a tire pressure gage, it is applied in the usual way to the end of the tire valve and these parts perform their functions of packing the joint and unseating the valve.

In an engine gage and for other purposes, it is sometimes desirable that the indicator shall be capable of moving downwardly with the plunger as the latter returns toward its normal position so that differences in pressures may be observed. When used as a tire pressure gage, however, and under certain conditions in other uses it is desirable that the indicator shall remain in the position to which it has been moved by pressure, the plunger retiring as the pressure is relieved.

For these reasons means are provided for connecting and disconnecting the indicator sleeve or analogous part with the plunger or head L. These means are shown in the drawings as a screw U passing through the top of the indicator sleeve and screwing into the head or plunger. The screw may be removed when it is desired to disconnect the parts. In order to hold the indicator O in its adjusting position when the parts are disconnected, a friction ring V is preferably provided at the lower end of the indicator sleeve.

The means for connecting and disconnecting the indicating sleeve are more broadly claimed in applicant's application, Serial No. 342,267, originally filed June 3, 1911, and refiled December 3, 1919. The means whereby the gage is attachable to a tire valve, and to a spark plug hole of an engine cylinder is also more broadly claimed in applicant's said application, Serial No. 342,267.

While I have shown in detail certain embodiments of my invention, I do not wish to be limited thereto since various changes may be made therein without departing from the invention.

What I claim is:—

1. A gage comprising a casing, a pressure responsive element in said casing adapted to move in response to variations of pressure acting against it, said casing being made of a single piece of metal and having engaging means on the exterior thereof for attaching the same to a recessed part of a fluid container, said gage having other means on the end of the casing adapted to make connection with a container, said gage when applied to a container by the use of the exterior engaging means, inclosing said other means for making connection with a casing, said gage having a restricted orifice through which communication with the pressure responsive element is established.

2. A pressure gage comprising a casing B made in a single piece, having threads E for attaching it directly to a wall or the like, wrench engaging faces G and a washer engaging shoulder H, an extensible tube K and a spring M within said casing, a part L to which said spring and tube are connected, and an indicating part O actuated by said part L.

3. A gage adapted for connection to a recessed part of a container or to a projecting part of a container, said gage comprising a casing having means thereon adapted to engage in a socket and means for making a tight contact connection with a projecting part, said socket engaging means, when applied to a container, inclosing said means for making tight connection with a projecting part.

4. A gage adapted for connection to a recessed part of a container or to a projecting part of a container, said gage comprising a casing having means thereon adapted to engage in a socket, and means for making a tight contact connection with a projecting part, said socket-engaging means, when applied to a container, inclosing said means for making tight connection with a projecting part, and a depressor of a tire valve in conjunction with said means for making a contact connection.

5. A gage adapted for connection to a recessed part of a container or to a projecting part of a container, said gage comprising a casing made of a single piece of metal and having means thereon adapted to engage in a socket, and means for making a tight contact connection with a projecting part, said socket-engaging means, when applied to a container, inclosing said means for making tight connection with a projecting part.

6. A gage adapted for connection to a recessed part of a container or to a projecting part of a container, said gage comprising a casing made of a single piece of metal and having means thereon adapted to engage in a socket, and means for making a tight contact connection with a projecting part, said socket-engaging means, when applied to a container, inclosing said means for making tight connection with a projecting part, said casing having a thickened portion shaped for engagement by a turning tool.

7. A gage adapted for connection to a recessed part of a container or to a projecting part of a container, said gage comprising a casing having at one end thereof means adapted to engage in a socket and means for making a tight contact connection with a projecting part, and a plate adapted to close said end, said plate having a restricted orifice therethrough and having a projecting part adapted to depress a valve stem when the gage is applied to a projecting part of a container, said restricted orifice being adapted to restrict an initial rush of fluid under pressure into said gage and to temper the change in pressure in the gage under fluctuations of pressure.

8. A gage adapted for connection to a recessed part of a container or to a projecting part of a container, said gage comprising a casing, a pressure responsive element and an indicator part, said casing having means therein adapted to engage in a socket and means for making a tight contact connection with a projecting part, such engaging means being capable of being directly applied, said indicator part being independently movable and adapted to maintain an actuated position when disconnected from said pressure responsive element, and means for connecting said indicator part and pressure responsive element whereby said indicator part may partake of the movements of said pressure responsive element.

9. A pressure gage having a fluid passageway, two operative connections for connecting said fluid passage-way with a source of pressure, said connections being of different character, one being adapted to make a tight joint with a pneumatic tire valve, and the other being an external screw-threaded connection adapted to enter a screw-threaded spark plug hole or the like of an engine cylinder.

10. A pressure gage having a fluid passage-way, two operative connections for connecting said fluid passage-way with a source of pressure, said connections being of different character, one being adapted to make a tight joint with a pneumatic tire valve, and the other being an external screw-threaded connection adapted to enter a screw-threaded spark plug hole of an engine cylinder or the like, and said gage having a casing on which said last-named connection is formed.

In witness whereof, I have hereunto signed my name in the presence of two subscribing witnesses.

MAXIMILIAN CHARLES SCHWEINERT.

Witnesses:
  THOS. F. WALLACE,
  RENÉ BRUINE.